United States Patent [19]

Harrold

[11] Patent Number: 5,593,065
[45] Date of Patent: Jan. 14, 1997

[54] METERED DUAL DISPENSER CAP FOR SQUEEZE CONTAINERS

[75] Inventor: John E. Harrold, Bloomsbury, N.J.

[73] Assignee: Pakmax, Inc., Bloomsbury, N.J.

[21] Appl. No.: 419,138

[22] Filed: Apr. 10, 1995

[51] Int. Cl.⁶ .................................. B65D 35/22
[52] U.S. Cl. .............. 222/94; 222/145.3; 222/205; 222/207; 222/514; 222/522
[58] Field of Search ............ 222/94, 129, 145.3, 222/157, 158, 205, 207, 496, 514, 522

[56] References Cited

U.S. PATENT DOCUMENTS

| | | | |
|---|---|---|---|
| 2,774,517 | 12/1956 | Teegardin et al. | 222/205 |
| 3,141,574 | 7/1964 | Donoghue | 222/157 |
| 3,581,940 | 6/1971 | Cella | 222/94 |
| 4,687,663 | 8/1987 | Schaeffer | 222/94 X |
| 4,875,603 | 10/1989 | Weinstein | 222/205 |
| 4,941,520 | 7/1990 | Dowzall et al. | 222/158 X |
| 5,386,928 | 2/1995 | Blette | 222/94 |

*Primary Examiner*—Joseph Kaufman
*Attorney, Agent, or Firm*—Kenneth P. Glynn, Esq.

[57] ABSTRACT

The metered dual dispenser cap is for dual compartmented squeeze type containers which separately contain two distinct materials. The metered dual dispenser cap has a lower portion which is reciprocally attached to an upper portion. The lower portion has two inlets, each regulated by one way valves. The two inlets lead to two chambers which in turn lead through two outlet shafts to two dispensing outlets in the upper portion. The flow from the two chambers to the two dispensing outlets is regulated by two one way valves which are controlled by a push button on top of the cap. The volume expansion of the chambers, as the upper portion is pulled away from the lower portion, may be determined from optional scale gradations on the outer male wall. The scale gradations are increasingly exposed as the upper portion is pulled away to increase the volume in the chambers.

14 Claims, 2 Drawing Sheets

METERED DUAL DISPENSER CAP FOR SQUEEZE CONTAINERS

BACKGROUND OF THE INVENTION

1. Field of the Invention

The present invention relates to a device for metered dispensing of dual components. The device is a dual component, dual compartment squeezable container for dispensing through a cap with corresponding dual dispensing outlets. In particular, this invention is directed to a dispensing system which maintains the multicompartmented materials separate throughout the metered dispensing process.

2. Information Disclosure Statement

The following patent represents the state of the art with respect to metered dispensing devices:

U.S. Pat. No. 4,875,603, issued to Weinstein, discloses a metered dispensing cap system for single compartmented tubes. The system has a base element which is attachable to the neck of a squeezable container. The base element has an opening in the top with a one way valve for outflow of a material from a squeezable container. The system also includes a meter element which has a sidewall portion and a top with an opening for the dispensing of material therefrom. The meter element slides over and against the base element, to fill up with material as the container is squeezed, or dispense material as the meter element is pushed down against the container.

Notwithstanding prior art in metered dispensing systems, none of the prior art systems describe a dual outlet cap which separately dispenses two distinct materials from a dual compartmented squeezable container.

SUMMARY OF THE INVENTION

The present invention involves a metered dual dispenser cap for a dual component, dual compartment squeezable container. The dispenser cap has a main housing with a lower portion which threads onto the neck of a squeezable tube type container. The lower portion has two inlet openings wherein flow through the inlet openings is regulated by one way valves which only permit material to flow out of the container. The lower portion has two chambers, connected to the two inlet openings, which accept or fill with material from the dual component, dual compartmented container. The lower portion is slidably and reciprocally attached to an upper portion. The upper portion has one way exit valves which fit inside the chambers of the lower portion. These one way exit valves are closed to permit metered filling of the chamber when the container is squeezed. With these one way exit valves closed, as the tube-type container is squeezed the upper portion slides away from the lower portion to permit the chambers to expand and accept more material from the container.

When the one way exit valves are depressed or opened, outlet shafts leading to dispensing outlets are opened to the chambers. With the one way exit valves held open, the upper portion is pushed against the lower portion forcing material in the chambers out through the outlet shafts and out through the dispensing outlets. The travel or sliding of the upper portion relative to the lower portion is limited by a lower portion stop checking an upper portion stop. In a preferred embodiment the one way exit valves are synchronized and held together by a button which is biased by a spring to maintain the one way exit valves closed. As an option, the outer male wall of the lower portion may have scaled gradations to indicate the amount of volume expansion in the chambers as the upper portion is pulled away and its outer female wall exposes the outer male wall of the lower portion. The scaled gradations would provide an indication of the amount of material that will be dispensed when the upper portion is completely pressed against the lower portion.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

Figure 1:
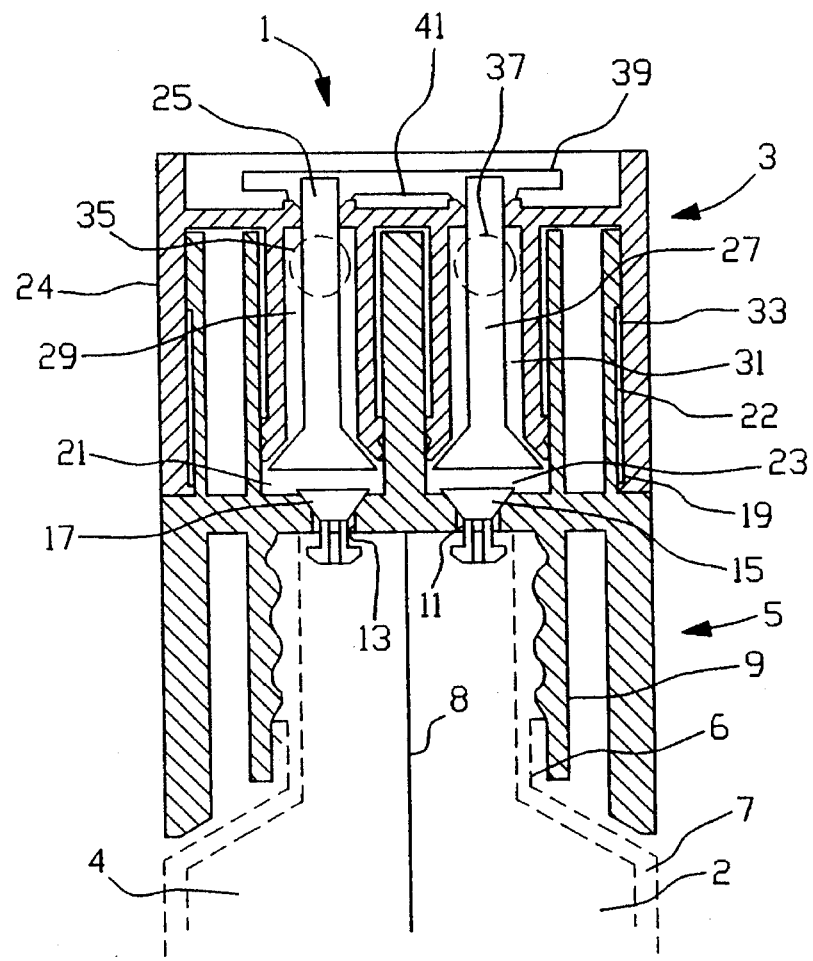
FIG. 1 is a perspective view of an embodiment of a metered dual dispenser cap for a dual component, dual compartmented squeeze container; and, FIG. 2 is a detail cross section view of the metered dual dispenser cap shown in FIG. 1.

Referring now to the drawings, there is shown in FIG. 1, a cross section detail of a preferred embodiment of a metered dual dispenser cap 1 for a dual component, dual compartmented squeeze container 7. The cap 1 has a main housing consisting of an upper portion 3 which is slidably and reciprocally connected to a lower portion 5. The lower portion 5 has an outer male wall 22 with an outwardly protruding ledge 33. The upper portion 3 has an outer female wall 24 with an inwardly protruding ledge 19. The outer female wall 24 reciprocates outside and against the outer male wall 22. The upper portion 3 may slide away from the lower portion 5 till movement of the upper portion stop 19 is checked by the lower portion stop 33.

The lower portion 5 is attached by connection means 9 to a container outlet neck 6 of a container 7 having dual compartments 2 and 4 for holding two different materials or components. The connection means 9 as shown in FIG. 1 is a male female threaded connection which may be permanent or temporary. Alternatively, the connection means could be a temporary or permanent snap on or solvent weld connection. The division between the dual compartments 2 and 4 is maintained to the top of the container outlet neck 6 by a separation 8, so as to prevent commingling when the materials in the dual compartments 2 and 4 are dispensed from the container 7 into chambers 21 and 23. The lower portion also has dual inlets 11 and 13 with one way valves 15 and 17 respectively, which allow material in the dual compartments 2 and 4 to be dispensed from the container 7 as it is squeezed, and prevent backflow of material into the dual compartments when the upper portion 3 is pushed against the lower portion 5.

The upper portion 3 has chambers 21 and 23 which accept dispensed material from dual compartments 4 and 2 respectively as the container 7 is squeezed. The chambers 21 and 23 lead into outlet shafts 29 and 31 which in turn lead into dispenser outlets 35 and 37 respectively. The outlet shafts 29 and 31 may be closed off when one way exit valves 25 and 27 respectively, are biased in a closed position. The one way exit valves 25 and 27 have extensions which protrude to an outside area of the upper portion. Shown is a button 39 attached to both of the protruding extensions of the one way exit valves 25 and 27 so as to move these one way exit valves from a closed position to an open position. This will also assure that both chambers 21 and 23 receive equal amounts of material dispensed from the container and dispense equal amounts of material through dispensing outlets 35 and 37. Alternative embodiments may allow the exit one way valves 25 and 27 to be separately controlled to allow separate and different metering selections in dispensing the material from compartments 2 and 4. Also shown as an option is a biasing spring 41 which maintains the button away from the upper portion, in turn maintaining the exit one way valves 25 and 27 in a closed position when the chambers 21 and 23 are to be filled. The button 39 need only be kept depressed when the material in the chambers is to be dispensed.

While one way inlet valves 13 and 15, and one way exit valves 25 and 27 are shown as tapered stoppers, they could in alternative embodiments be spring loaded types, flapper types or any type of one way valve appropriate to the function of the dispensing cap 1.

As an option, the outer male wall of the lower portion may have scaled gradations to indicate the amount of volume expansion in the chambers as the upper portion is pulled away and its outer female wall exposes the outer male wall of the lower portion. The scaled gradations would provide an indication of the amount of material that will be dispensed when the upper portion is completely pressed against the lower portion.

In summary, operation of the metered dual dispenser cap for a dual component, dual compartmented squeeze container shown in FIG. 1 begins with the button 39 unpressed so as to have one way exit valves 25 and 27 in the closed position and the upper portion 3 is seated against the lower portion 5. The user squeezes container 7 causing one way inlet valves 15 and 17 to open and to allow the materials from dual compartments 2 and 4 to flow through inlets 11 and 13 into chambers 23 and 21. As the container 7 is continuously squeezed and chambers 21 and 23 fill up, and force upper portion 3 to slide away from the lower portion 5 allowing the chambers 21 and 23 to expand and accept more material from the container 7. The upper portion 3 will slide to expand the chambers 21 and 23 until movement of the upper portion stop 19 is checked by the lower portion stop 33.

Figure 2:
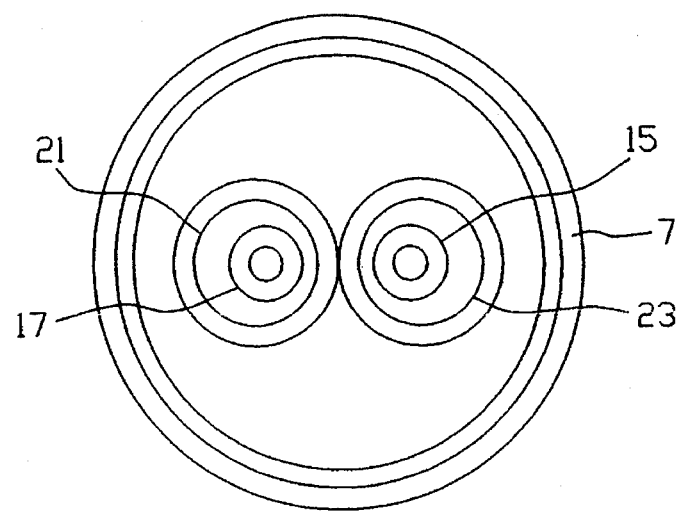

Shown in FIG. 2 is a cross sectional top view of the embodiment in FIG. 1. FIG. 2 illustrates the relative axial positions of the inlets 15 and 17, chambers 21 and 23, and the container 7.

Figure 3:
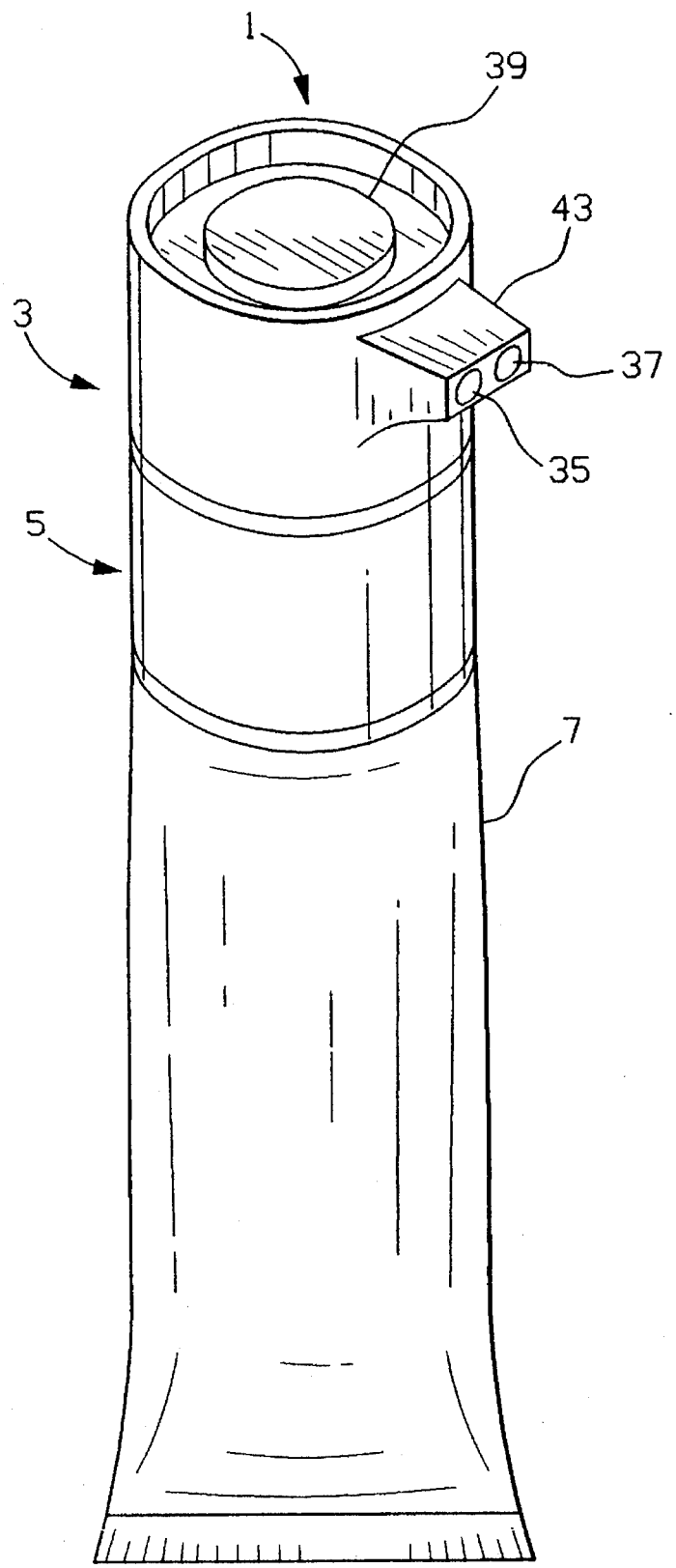
FIG. 3 is a full perspective view of a metered dual dispenser cap attached to a tube type squeeze container.

Referring now to FIG. 3, there is shown a perspective view of the metered dual dispenser cap of FIG. 1. The dual component, dual compartmented squeezable container is a tube attached to the lower portion 5. The lower portion 5 is attached to the upper portion 3. Two circular dispenser outlets 35 and 37, through which material in the container dispenses, emanate from a protrusion extending from the upper portion 3. Nested flush with the top of the upper portion 3 is a button 39, which is held down to dispense material through the dispensing outlets 35 and 37 when the upper portion 3 is pushed against the lower portion 5.

In alternative embodiments, the dispensing outlets 35 and 37 may have non circular cross sections such as a square, star, cross hair or circular with sawtooth perimeter, etc., to achieve various dispensing patterns. Also the dispensing outlets could be joined as one distinct outlet to allow the contents of the dual compartmented container to commingle before being dispensed from the cap 1. Moreover, the squeeze container 7 shown in FIG. 3, rather than a squeeze tube, may be a rigid cylindrical container with a moveable bottom to be pushed for dispensing material from the container into the metered dispensing cap. Such a container would eliminate waste typically associated with unsqueezed material being left inside when such tube-type containers are disposed.

Obviously, numerous modifications and variations of the present invention are possible in light of the above teachings. For example, the dispenser cap can consist of upper and lower portions having multiple inlets, multiple one way inlet and exit valves, multiple chambers, multiple outlet shafts and multiple dispensing outlets for dispensing a multicomponent, multicompartmented squeezable container. Alternatively, the dispensing outlets can be distinct or joined together to allow the contents from the separate compartments in the container to commingle before final dispensing. Also, inlets 11 and 13 could be modified to properly feed materials of different viscosities, i.e. smaller or longer so chambers 21 and 23 will fill at the same time and rate. In addition, chambers 21 and 23 can be different sizes to dispense different ratios of product. It is therefore understood that within the scope of the appended claims, the invention may be practiced otherwise than as specifically described herein.

What is claimed is:

1. A metered multiple dispenser cap which comprises:
a main housing having a lower portion with means for connection to a multicomponent, multicompartmented squeezable container, and having multiple inlets located within said lower portion, each such inlet having a one-way valve permitting movement of flowable material only from said multicomponent, multicompartmented squeezable container into said cap, said main housing also having an upper portion which is slidably and reciprocally connected to said lower portion, said lower portion having multiple chambers corresponding to said multiple inlets, said upper portion having multiple outlet shafts connected to said chambers, and said upper portion having a multiple dispensing outlets connected to said multiple outlet shafts, each of said multiple outlet shafts having a one-way exit valve which prevents movement of flowable material from said chambers to said outlet shafts when said upper portion is being moved away from said lower portion and so as to permit movement of flowable material through said outlet shafts and through said dispensing outlets when said one-way exit valves and said upper portion are moved toward said lower portion, said one-way exit valves having extensions which protrude to an outside area of said upper portion of said main housing so as to be passable to an open position from a closed position.

2. The dispenser cap of claim 1, wherein said extensions protrude from a top surface of said upper portion of said main housing and said extensions are joined to form a single depressor button.

3. The dispenser cap of claim 2, wherein said one-way exit valves are biased to a closed position.

4. The dispenser cap of claim 3, wherein said biasing is achieved by at least one biasing spring.

5. The dispenser cap of claim 1, wherein said, one-way exit valves are biased to a closed position.

6. The dispenser cap of claim 5, wherein said biasing is achieved by at least one biasing spring.

7. The dispenser cap of claim 1, wherein said outlets have external covers thereon which are spring biased to a closed position.

8. A metered dual dispenser cap which comprises:

a main housing having a lower portion with the means for connection to a multicomponent, multicompartmented squeezable container, and having multiple inlets located within said lower portion, each such inlet having a one-way valve permitting movement of flowable material only from said multicomponent, multicompartmented squeezable container into said cap, said main housing also having an upper portion which is slidably and reciprocally connected to said lower portion, said lower portion having multiple chambers corresponding to said multiple inlets, said upper portion having multiple outlet shafts connected to said chambers, and said upper portion having a multiple dispensing outlets connected to said multiple outlet shafts, each of said multiple outlet shafts having a one-way exit valve which prevents movement of flowable material from said chambers to said outlet shafts when said upper portion is being moved away from said lower portion and so as to permit movement of flowable material through said outlet shafts and through said dispensing outlets when said one-way exit valves and said upper portion are moved toward said lower portion, said one-way exit valves having extensions which protrude to an outside area of said upper portion of said main housing so as to be passable to an open position from a closed position.

9. The dispenser cap of claim 8, wherein said extensions protrude from a top surface of said upper portion of said main housing and said extensions are joined to form a single depressor button.

10. The dispenser cap of claim 9, wherein said one-way exit valves are biased to a closed position.

11. The dispenser cap of claim 10, wherein said biasing is achieved by at least one biasing spring.

12. The dispenser cap of claim 8, wherein said one-way exit valves are biased to a closed position.

13. The dispenser cap of claim 12, wherein said biasing is achieved by at least one biasing spring.

14. The dispenser cap of claim 8, wherein said outlets have external covers thereon which are spring biased to a closed position.

* * * * *